US012670928B2

(12) United States Patent     (10) Patent No.:     US 12,670,928 B2
    Pallay                         (45) Date of Patent:         Jun. 30, 2026

(54) HEAD GIMBAL ASSEMBLY WELD DIMPLES

(71) Applicant: Seagate Technology LLC, Fremont, CA (US)

(72) Inventor: Mark Pallay, Bloomington, MN (US)

(73) Assignee: Seagate Technology LLC, Fremont, CA (US)

( * ) Notice: Subject to any disclaimer, the term of this patent is extended or adjusted under 35 U.S.C. 154(b) by 58 days.

(21) Appl. No.: 18/610,433

(22) Filed: Mar. 20, 2024

(65) Prior Publication Data

US 2025/0299692 A1     Sep. 25, 2025

(51) Int. Cl.
    *G11B 5/48*     (2006.01)

(52) U.S. Cl.
    CPC .................................. *G11B 5/4826* (2013.01)

(58) Field of Classification Search
    None
    See application file for complete search history.

(56) References Cited

U.S. PATENT DOCUMENTS

| | | | |
|---|---|---|---|
| 5,136,445 A | 8/1992 | Zak | |
| 6,128,164 A | 10/2000 | Kant et al. | |
| 6,154,952 A * | 12/2000 | Tangren ................ | G11B 5/4826 |
| | | | 29/603.04 |
| 6,215,627 B1 | 4/2001 | Resh et al. | |
| 6,417,995 B1 * | 7/2002 | Wu ....................... | G11B 5/4826 |
| 6,522,503 B2 * | 2/2003 | Takadera ............... | G11B 21/16 |

| | | | |
|---|---|---|---|
| 7,283,332 B2 | 10/2007 | Weber | |
| 7,538,979 B2 | 5/2009 | Hagen | |
| 8,254,063 B2 | 8/2012 | Zambri et al. | |
| 8,446,695 B1 | 5/2013 | Ee et al. | |
| 8,837,090 B2 | 9/2014 | Greminger et al. | |
| 9,865,285 B2 * | 1/2018 | Tanaka ................. | G11B 5/4853 |
| 10,957,350 B1 | 3/2021 | Deokar et al. | |
| 11,037,589 B1 | 6/2021 | Deokar et al. | |
| 11,289,120 B1 | 3/2022 | Pallay | |
| 11,308,982 B1 | 4/2022 | Pallay | |
| 11,348,611 B1 | 5/2022 | Mendonsa et al. | |
| 11,361,787 B1 | 6/2022 | Mendonsa et al. | |
| 11,430,472 B1 | 8/2022 | Ma et al. | |
| 11,488,624 B1 | 11/2022 | Liu et al. | |
| 11,854,582 B2 * | 12/2023 | Nishida ............... | G11B 5/4833 |
| 11,862,210 B2 * | 1/2024 | Takikawa ............. | G11B 5/4826 |
| 2006/0007599 A1 * | 1/2006 | Shum ................... | G11B 5/4833 |
| | | | 360/244.8 |
| 2011/0096439 A1 * | 4/2011 | Soga .................... | G11B 5/4826 |

(Continued)

*Primary Examiner* — William J Klimowicz

(74) *Attorney, Agent, or Firm* — Westman, Champlin & Koehler, P.A.

(57)     ABSTRACT

A data storage device includes a data storage disk, an actuator arm, a load beam attached to the actuator arm, and a flexure attached to the load beam. The disk has a read/write surface defining an x-y plane, and the actuator arm is movable parallel to the x-y plane. The load beam supports a slider that carries a head that is configured to interact with the read/write surface. The load beam includes a first dimple that extends toward the read/write surface and has a flat base. The flexure is attached to the load beam at the flat base of the first dimple and is attached to the slider. The flexure is substantially parallel to the x-y plane between the flat base of the dimple and the slider. In another aspect, an actuator arm assembly includes a load beam with weld dimples.

20 Claims, 9 Drawing Sheets

(56) References Cited

U.S. PATENT DOCUMENTS

| 2014/0022675 | A1* | 1/2014 | Hanya | G11B 5/483 |
| | | | | 360/244.5 |
| 2021/0287700 | A1* | 9/2021 | Nesori | G11B 5/4853 |
| 2023/0197109 | A1* | 6/2023 | Nishida | G11B 5/4833 |
| | | | | 360/245.3 |
| 2023/0290373 | A1* | 9/2023 | Takikawa | G11B 5/4833 |
| 2025/0182784 | A1* | 6/2025 | Hoshi | G11B 5/484 |

* cited by examiner

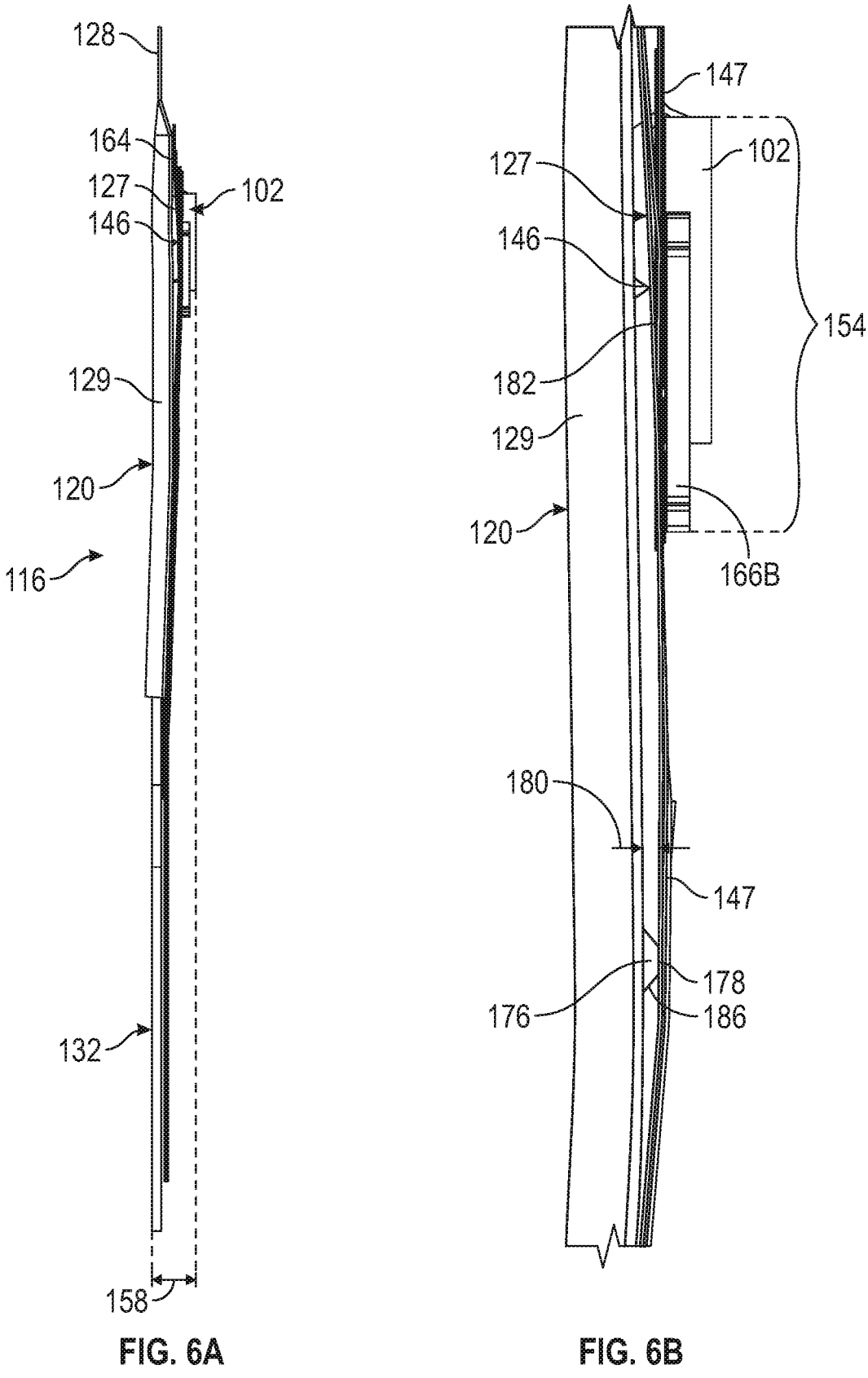
FIG. 6A                    FIG. 6B

HEAD GIMBAL ASSEMBLY WELD DIMPLES

TECHNICAL FIELD

The disclosure relates to a head gimbal assembly for a hard disk drive.

BACKGROUND

Hard disk drives utilize one or more magnetic recording heads fabricated on sliders to read and write data on magnetic storage media. Typically, a slider is mounted on a trace gimbal assembly (TGA); the combination of the slider and TGA is collectively known as a head gimbal assembly (HGA). In the HGA, the slider is suspended on a thin cushion of air or gas just above the surface of the magnetic storage media.

SUMMARY

In one embodiment, a data storage device comprises a data storage disk, an actuator arm, a load beam attached to the actuator arm, and a flexure attached to the load beam. The disk has a read/write surface defining an x-y plane, and the actuator arm is movable parallel to the x-y plane. The load beam supports a slider that carries a head that is configured to interact with the read/write surface. The load beam comprises a first dimple that extends toward the read/write surface and has a flat base. The flexure is attached to the load beam at the flat base of the first dimple and is attached to the slider. The flexure is substantially parallel to the x-y plane between the flat base of the dimple and the slider.

In another embodiment, an actuator arm assembly comprises an actuator arm, a load beam and a flexure. The load beam has a first end attached to the actuator arm and an opposed second end, wherein the load beam comprises a first dimple that comprises a flat base, and the flexure is attached to the load beam at the flat base of the first dimple.

Other features and benefits that characterize embodiments of the disclosure will be apparent upon reading the following detailed description and review of the associated drawings.

BRIEF DESCRIPTION OF THE DRAWINGS

FIG. 6A is a side elevation view of the HGA of FIG. 2, having a nominal Z-height.

FIG. 6B is an enlarged view of a portion of FIG. 6A.

DETAILED DESCRIPTION OF ILLUSTRATIVE EMBODIMENTS

Figure 1:
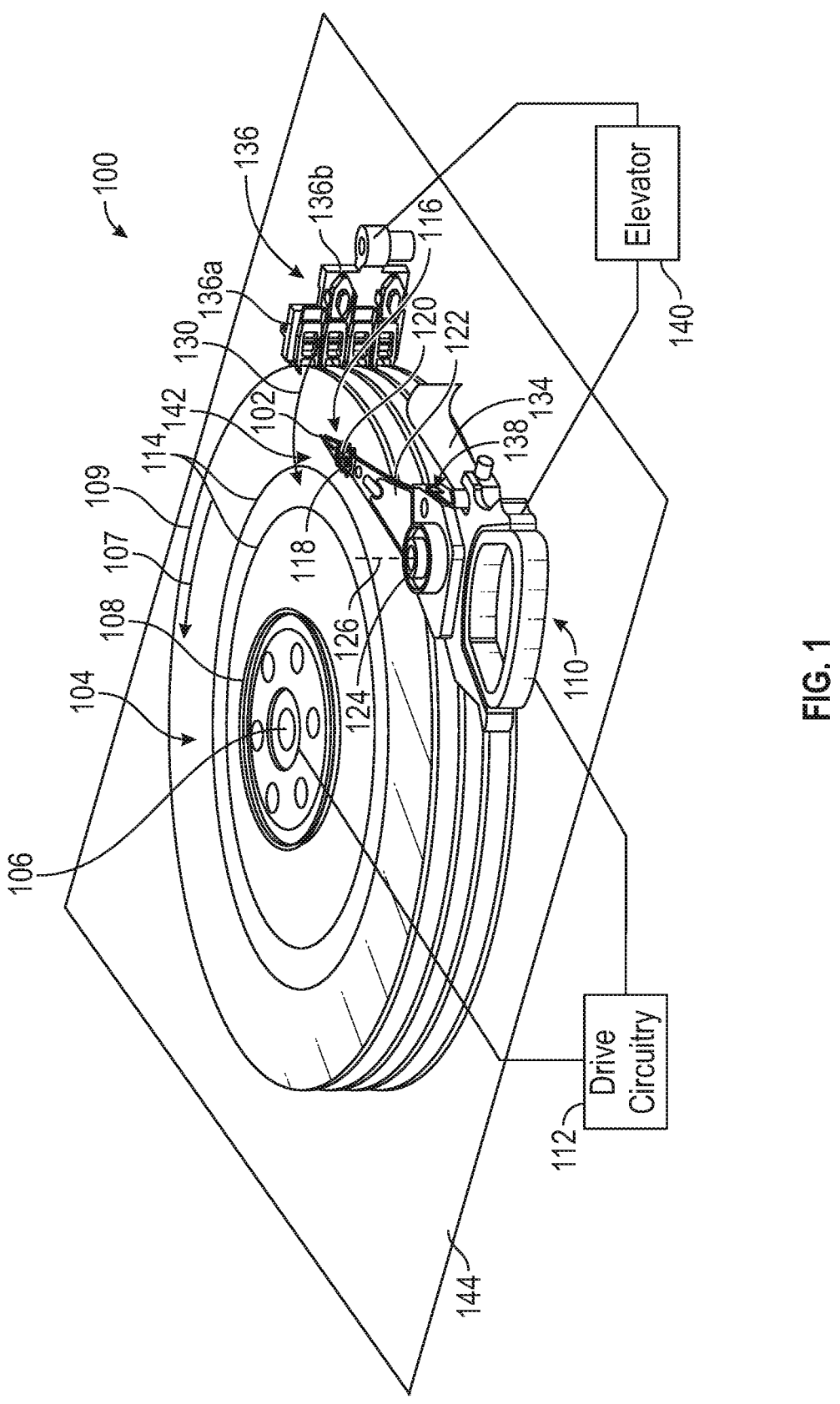
FIG. 1 is a schematic illustration of an exemplary data storage device.

FIG. 1 shows an illustrative operating environment in which certain embodiments disclosed herein may be incorporated. The operating environment shown in FIG. 1 is for illustration purposes only. Embodiments of the present disclosure are not limited to any particular operating environment and can be practiced within any number of different types of operating environments.

It should be noted that the same reference numerals are used in different figures for the same or similar elements. All descriptions of an element also apply to all other versions of that element unless otherwise stated. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

Two specific embodiments of a weld dimple 176 are described, and in some cases they will be differentiated by referring to the first embodiment with reference number 176A and the second embodiment with reference to number 176B. However, in many aspects, the structures are similar; descriptions of weld dimple 176, 176A or 176B apply to all embodiments unless otherwise specified. This convention also applies to other similarly numbered elements.

FIG. 1 is a schematic illustration of a data storage device (DSD) 100 including data storage media 104, a slider 102 carrying heads for reading data from and/or writing data to the data storage media 104, and a split ramp 136 for supporting a suspension load beam 120 that supports the slider 102. In the embodiment shown in FIG. 1, the data storage media 104 are rotatable data storage disks stacked on spindle 106, with each disk 104 having opposing surfaces that serve as data storage surfaces. For read and write operations, a spindle motor rotates the media 104 as illustrated by arrow 107, and actuator mechanism 110 positions the slider 102 relative to data tracks 114 on the rotating media 104 between an inner diameter (ID) 108 and an outer diameter (OD) 109. Both the spindle motor and actuator mechanism 110 are connected to and operated through drive circuitry 112 (schematically shown). The actuator mechanism 110 may have a voice coil drive, for example.

Figure 2:
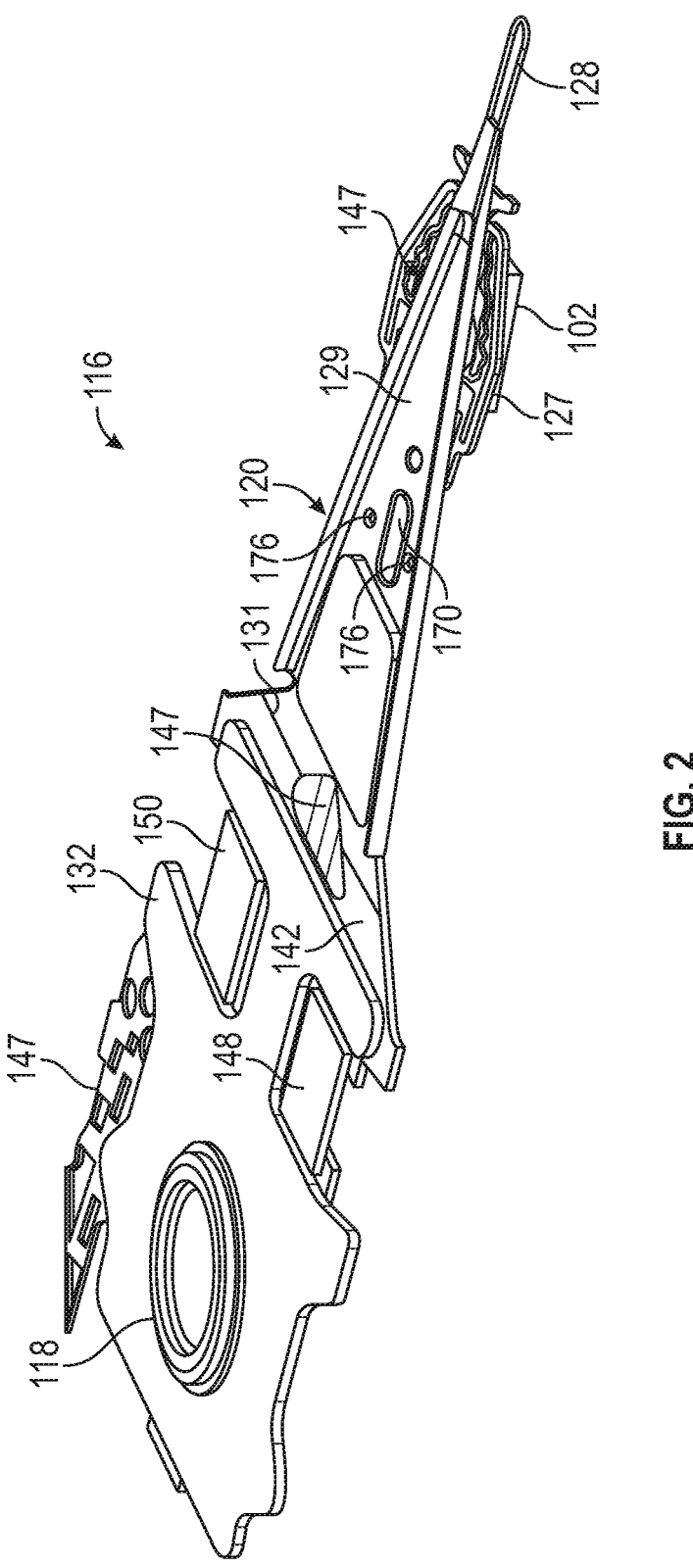
FIG. 2 is a perspective view of an exemplary HGA, in accordance with aspects of this disclosure.

The actuator mechanism 110 is rotationally coupled to a frame or base deck 144 through a pivot shaft 124 to rotate actuator arm 122 about longitudinal axis 126 of shaft 124. As shown in FIG. 2, the head gimbal assembly (HGA) 116 has an attachment structure 118 on base plate 132 configured to connect to the actuator arm 122. Air bearing slider 102 is carried by load beam 120 and includes one or more transducer elements, such as read/write heads (not shown), coupled to head circuitry through flex circuit 134, shown in FIG. 1. The actuator mechanism 110 moves the slider 102 in a cross-track direction as illustrated by arrow 130. In an exemplary embodiment, slider 102 is aerodynamically designed to fly on an active air bearing (AAB) that is created adjacent to the disk surface during disk rotation.

In general, in order to prevent slider 102 from landing on disks 104 in a data storage device 100 when, for example, power is removed from the data storage device 100, and to prevent the slider 102 from colliding with outer edges of the disks 104 during load and unload operations, a head support ramp assembly 136 is provided adjacent to the OD 109 of the disks 104.

In the illustrated embodiments, the air bearing slider 102 for carrying the read/write heads is shown as attached to a bottom surface of the load beam 120. However, it is to be understood that an actuator arm can also carry a load beam that has a slider with read/write heads that face upward from the load beam, in a configuration that allows the heads to read and write data relative to a data surface of a disk 104 that is positioned above the load beam.

In an exemplary embodiment in which the number of sliders 102 is fewer than a number of data surfaces of media 104, actuator arm 122 may be moved in a z direction (along axis 126 of shaft 124) to different height positions under the motive of elevator 140, which is schematically shown in FIG. 1. Thus, a single HGA 116 can be moved to place its slider 102 in position to read and write data from any of the disks 104 of the stack of data storage disks. In general, any suitable driving mechanism may be used to move elevator 140 up and down. Exemplary drivers for Z direction motion of elevator 140 include a ball screw with an internal motor, a voice coil motor, an inchworm style brake crawler, a linear motor, a shape memory alloy based actuator, and a combination of the above.

When the read/write heads of a slider 102 are not actively in use for data transfer operations, the actuator mechanism 110 can be activated to rotate the actuator arm 122 in order to place the lift tab 128 of load beam 120 on head support ramp assembly 136. Head-support ramp assembly 136 in some embodiments is designed as a split ramp with a stationary portion 136a and moveable portion 136b. With lift tab 128 supported on the moveable ramp 136b, the paired actuator arm 122 and the moveable portion 136b can be moved in unison along axis 126 (such as vertically or in a z direction) by the operationally connected elevator 140. In some embodiments, an entire ramp 136 or a portion thereof can also be moved in the x-y plane off the disk stack, such as by retraction, flexing, or rotation, for example.

While the illustrated environment of FIG. 1 depicts a DSD with a rotary actuator mechanism 110, it is to be understood that the disclosed concepts can also be practiced in a DSD having a linear driver for the actuator arm, such as described in commonly owned U.S. Pat. No. 11,348,611 for "Zero Skew Elevator System," and in commonly owned U.S. Pat. No. 11,361,787 for "Zero Skew Disk Drive with Dual Actuators," and in commonly owned U.S. Pat. No. 11,430,472 for "Triple Magnet Linear Actuator Motor," and in commonly owned U.S. Pat. No. 11,488,624 for "Ball Bearing Cartridge for Linear Actuator," which are hereby incorporated by reference.

FIG. 2 is a perspective view of HGA 116, according to various aspects of this disclosure. HGA 116 includes a base plate 132, a load beam 120, a flexure 147 including a gimbal 127, and a slider 102. Baseplate 132 includes an attachment structure 118, such as a boss tower, that is configured to couple to actuator arm 122 of FIG. 1. In one example, attachment structure 118 is integrally formed with baseplate 132. Baseplate 132 and attachment structure 118 may each be made of a ferrite (e.g., stainless steel) or other suitable material (e.g., aluminum, engineered plastic, and the like).

In one example, load beam 120 includes a base portion 142, a hinge region 131 and a rigid region 129. Load beam 120 may be made of a ferrite (e.g., stainless steel) or other suitable material. Base portion 142 of load beam 120 is mechanically coupled to baseplate 132. In some examples, base portion 142 is coupled to baseplate 132 via welding (e.g., laser welding). Hinge region 131 (also referred to as a spring region) provides load beam 120 with a preload force that acts against the lift force action of slider 102 as slider 102 flies relative to the disk surface. The preload force urges slider 102 towards the surface of a magnetic media 104 during flight to maintain a desired fly height. In some examples, hinge region 131 is integrated with and contiguous with load beam 120 as a single part. In the example of FIG. 2, hinge region 131 is disposed between base portion 142 and rigid region 129. Rigid region 129 of load beam 120 extends from hinge region 131 to the tip of the HGA 116 to which the lift tab 128 is attached.

Flexure 147 has a ring gimbal 127 that is attached, such as by welding at location 164 (see FIG. 6A) to load beam 120. Moreover, a central slider mounting region 154 of gimbal 127 is pivotable about a slider dimple 146 on load beam 120 (see FIG. 6B). Thus, gimbal 127 provides a moveable slider mounting pad to which slider 102 is attached so that slider 102 can move in the pitch, roll, and yaw directions in response to variations while flying relative to a disk surface. Other descriptions relevant to a slider dimple are described in commonly owned U.S. Pat. No. 8,837,090 for "Gimbal Limiter for Suspension with Lift Tab," which is hereby incorporated by reference.

Examples of active components of HGA 116 include readers, writers, and heaters of the magnetic recording head of slider 102 and microactuators 148, 150 of flexure 147. Flexure 147 electrically couples slider 102 to drive circuitry 112 and flex circuit 134. In an exemplary embodiment, flexure 147 includes an electrical trace ribbon 152 that is configured to provide electrical signal pathways to and from active components of HGA 116. In some examples, flexure 147 includes a substrate or bottom layer of insulating material (e.g., polyimide, glass fiber epoxy laminate, PTFE or other suitable material), capped with a top layer of insulating material (e.g., polyimide, glass fiber epoxy laminate, PTFE or other suitable material) with a layer of semi-rigid conducting material (e.g., copper, aluminum, tin, stainless steel or an alloy) disposed between the top and the bottom insulating layers. Flexure 147 may, in some examples, be bonded along HGA 116. In reference to FIG. 2, flexure 147 runs along load beam 120 from the base portion 142 to rigid region 129 to electrically connect with the read/write head of the slider 102. Electrical trace ribbon 152 may include any number of conductors that may be electrically coupled to slider 102, one or more microactuators 148, 150, and/or other active components.

As shown in the example of FIG. 2, HGA 116 includes a pair of microactuators 148 and 150 coupled to the baseplate 132. While the voice coil motor of FIG. 1 rotates actuator mechanism 110 to provide relatively coarse positioning of sliders 102, microactuators 148 and 150 provide HGA 116 with relatively fine or precision positioning of slider 102 at the surface of magnetic media 104. In one example, microactuators 148 and 150 are piezoelectric microactuators, and in some examples may be made of lead zirconate titanate (PZT). Piezoelectric microactuators convert an electrical signal into controlled physical displacements. In an exemplary embodiment, microactuators 148, 150 expand and contract to move the slider 102 over a media surface. This movement can be used to provide a secondary, finer resolution level of tracking of slider 102, such as tracking of a slider 102 relative to data tracks 114 of FIG. 1, supplementing the tracking provided by voice coil drive motor and actuator mechanism 110. The additional resolution provided by microactuators 148, 150 may enable data tracks 114 on a media surface 104 to be closer to one another, thereby potentially increasing the areal density capability of a hard disk drive.

In an exemplary embodiment, slider 102 is suspended in proximity to a media surface 104 and is supported by load beam 120. Load beam 120 exerts a force, known as the preload force, on slider 102 through rigid region 129 of load beam 120. The preload force urges slider 102 toward the media surface. An opposing force directed away from the media surface is exerted on slider 102 by a cushion of air, helium or other gas proximal to an outer surface of slider 102 that faces the media surface. This cushion of gas, known as an active air bearing (AAB), is produced from a dynamic flow of gas across a pattern of recessed sub-surfaces bound within the volume of slider 102 by the outer surface of slider 102 that faces the media surface. The force of the AAB on slider 102 in a direction facing away from the media surface is countered by the preload force exerted on slider 102 by load beam 120. These opposing forces maintain slider 102 at a passive fly height above the media surface as the media is rotating. The writers and readers (not shown) of a magnetic recording head of slider 102 protrude from the media facing surface of slider 102 toward the media surface with assistance from active heaters of the magnetic recording head. These protrusions are controlled to maintain slider 102 at a desired active fly height during read and write operations.

As shown in FIG. 6B, slider dimple 146 protrudes from the rigid region 129 of load beam 120 toward slider 102. Slider dimple 146 is configured as a conical or hemispherical protrusion to provide a pivot point for movement of slider 102 and transfer the preload force from load beam 120 to slider 102. In the illustrated embodiment, the main mechanical support of slider 102 mounted to slider support region 154 comes from gimbal 127 and load beam 120, by way of contact at slider dimple 146. In such cases, slider dimple 146 provides a region of pivot motion of slider 102 in the pitch, roll, and yaw directions, and gimbal 127 provides structural support for slider 102 as it pivots about slider dimple 146.

Figure 3:
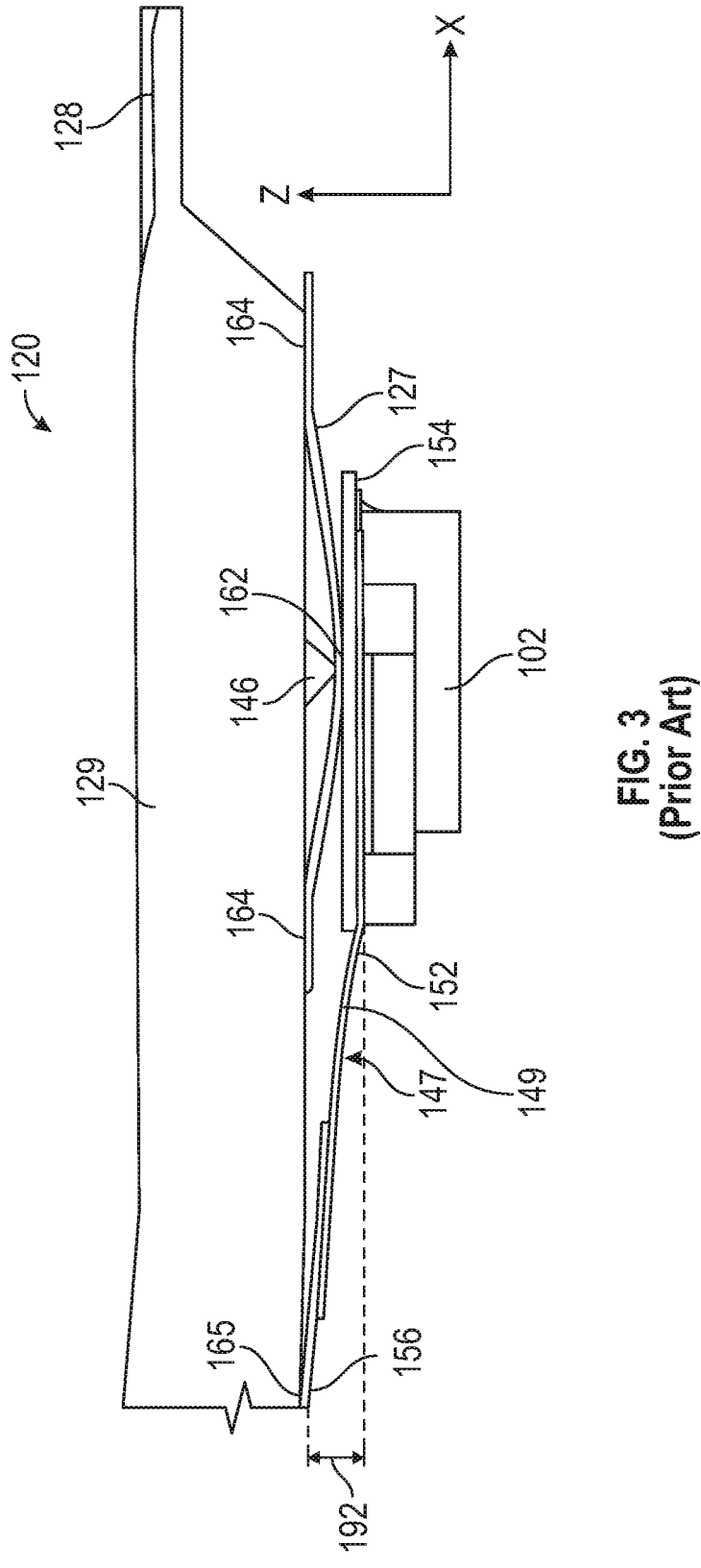
FIG. 3 is a side elevation partial view of a prior art HGA, illustrating a relatively large Z offset.

A known load beam is shown in FIG. 3 and described in commonly owned U.S. Pat. No. 11,037,589 for "Multi-piece Head Gimbal Assembly," which is hereby incorporated by reference. In this case, gimbal 127 is disposed between slider support region 154 of flexure 147 and rigid region 129 of load beam 120. In FIG. 3, the bottom surface of gimbal 127 is coupled to the top surface of slider support region 154 of flexure 147 (e.g., by gluing) at a location 162. The top surface of gimbal 127 is coupled to the bottom surface of load beam 120 (e.g., by welding) at locations 164. A top surface of rigid support piece 156 of flexure 147 is coupled to the bottom surface of load beam 120 at weld location 165. Thus, rigid region 129 of load beam 120, gimbal 127, slider support region 154 of flexure 147, and slider 102 are stacked in the z-direction. In the example of FIG. 3, motion of slider support region 154 of flexure 147, and thus slider 102, is mechanically supported by electrical trace ribbon 152, gimbal 127 and slider dimple 146. As shown in FIG. 3, the slider 102 can experience Z-height sensitivity in pitch stiffness and roll stiffness due to stretching of the electrical trace ribbon 152 between its attachment to load beam 120 at weld 165 and its attachment to slider 102. Moreover, there may also be some stretching of the metal framework of flexure 147. Generally, the circuit 152 is manufactured as a flat sheet. However, there is a Z offset 192 between the middle weld location 165 and the point of attachment to slider 102; any Z offset 192 will stretch the circuit.

Figure 4:
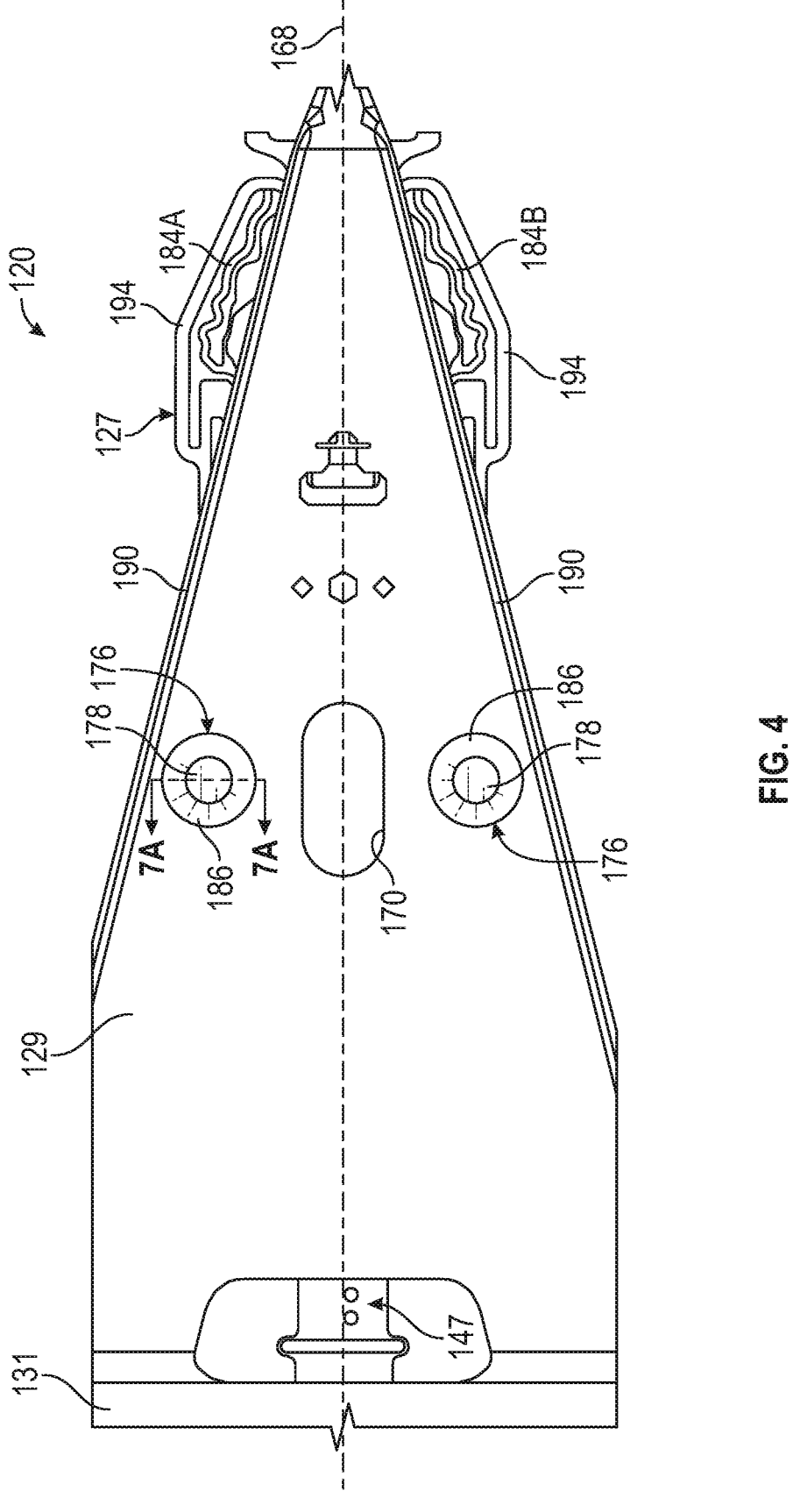
FIG. 4 is a top view of a portion of an exemplary load beam having weld dimples.

As shown in FIG. 4, in an exemplary embodiment of HGA 116 of the current disclosure, centerline 168 is a longitudinal x-direction line dividing HGA 116 in halves. In some scenarios, HGA 116 is substantially symmetrical (the halves are mirror images) about centerline 168. In an exemplary embodiment, two weld dimples 176 are equidistantly spaced from centerline 168 in the Y direction and lie in the same X direction plane. In an exemplary embodiment, the two weld dimples 176 are located on opposed sides of aperture 170. In an exemplary embodiment, a weld dimple 176 occupies at least some of the same X direction planes as the aperture 170.

Figure 5:
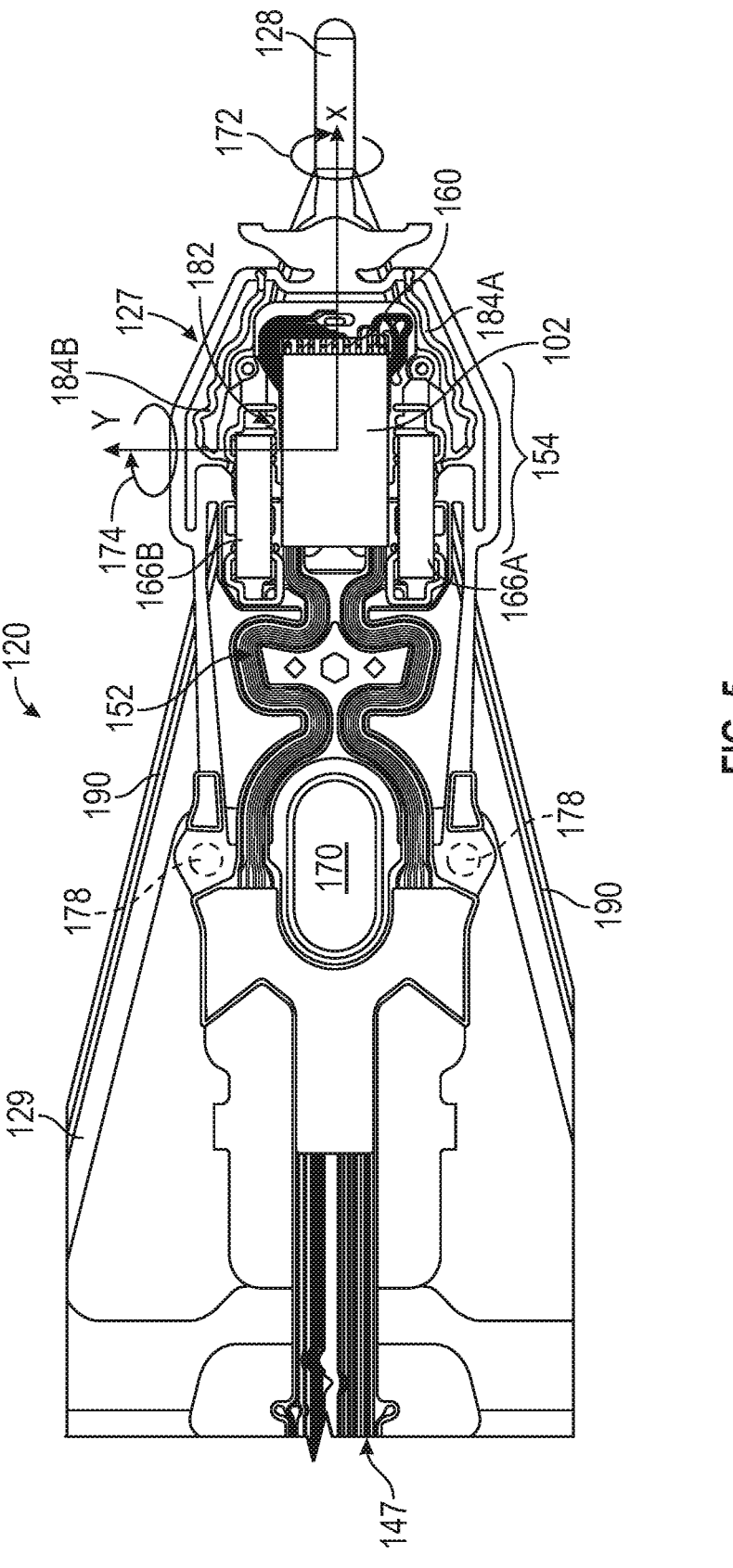
FIG. 5 is a bottom partial view of the exemplary load beam of FIG. 4, with weld dimples.

As shown in FIG. 5, in an exemplary embodiment, electrical trace ribbon 152 includes conductors that run alongside each side of flexure 147 to extend to a ring gimbal 127. Ring gimbal 127 includes a slider support region 154 configured to provide a surface for mounting slider 102 to flexure 147. In an exemplary embodiment, slider support region 154 may include one or more rigid pieces that may be made of metal, such as stainless steel, aluminum, or other metal. Slider support region 154 may include one or more flexible pieces, and, in some examples, layers of flexible and/or rigid pieces. In some examples, the pieces of slider support region 154 may be made of polymer, ceramic, or may be a layered laminate structure of metal, polymer, and/or ceramic materials. Slider 102 may be mounted to slider support region 154 using adhesive, epoxy, or other appropriate means of coupling an electrical component to a substrate.

In an exemplary embodiment, slider support region 154 includes bondpads 160 for electrically coupling electrical trace ribbon 152 to slider 102. An end of electrical trace ribbon 152 may terminate on slider support region 154 and may be electrically coupled to bondpads 160 via a conductive junction such as a solder contact.

Flexure 147 may, in some scenarios, include microactuators 166A and 166B (collectively, microactuators 166) that are configured to provide fine resolution positioning of slider 102 over a media surface during the reading and writing of data tracks 114. In an exemplary embodiment, microactuators 166 are coupled to slider support region 154 of flexure 147. Microactuators 166 may expand and contract to induce motion of slider 102 in the x-y plane of FIG. 5. Such motion may provide fine positioning resolution of a magnetic recording head of slider 102 during reading and writing data tracks 114. In some examples, microactuators 166 may be used in conjunction with microactuators that are coupled to a baseplate of HGA 116, such as microactuators 148, 150 of FIG. 2. A combination of microactuators coupled to a baseplate, as in the example of microactuators 148, 150 coupled to baseplate 132 in FIG. 2, and microactuators coupled to a flexure, as in the example of microactuators 166 coupled to slider support region 154 of flexure 147 in FIG. 5, may provide finer positioning resolution of a magnetic recording head over data tracks 114 of a media surface 104 than would be achievable for an HGA containing a single set of microactuators or no microactuators.

In an exemplary embodiment, gimbal 127 is configured to provide motive support to slider 102 as slider 102 moves in proximity to a media surface 104. Gimbal 127 is, in some examples, a rigid structure that includes a network of slots and beams. Gimbal 127 is sometimes referred to as a "ring gimbal" because of the generally annular shape conferred by struts or outriggers 194, for example. In one example, gimbal 127 is made of one or more metals (e.g., stainless steel), metal alloys, ceramic materials, polymeric materials, composite materials, or other structural materials. Gimbal 127 may be structurally designed to support the functional motion of slider 102 in the pitch, roll, and yaw directions while simultaneously reducing the amplitude of off-track movement of slider 102 in response to vibrations at resonance modes of HGA 116.

In some examples, flexible tethers 184A and 184B (collectively flexible tethers 184) are configured to act as stabilizers and restrain movement of the head-carrying region of the head gimbal assembly 116 in the z-direction (e.g., out of the page), also referred to as the down track direction. Though the flexible tethers 184 are intended to provide restraint to shock movement of the head-carrying region, in some examples, flexible tethers 184 are constructed from a low-stiffness material such that the freedom of movement of the head carrying region is not restrained. In one example, flexible tethers 184 may include a polyimide layer. Other descriptions relevant to a ring gimbal are described in commonly owned U.S. Pat. No. 10,957,350 for "Head Gimbal Assembly with Structural Yaw Stiffener," and in commonly owned U.S. Pat. No. 11,289,120 for "Stress-Reducing Gimbal Tethers," which are hereby incorporated by reference. In an exemplary embodiment, flexure 147 electrically connects the read and write heads of the slider 102, microactuators 166, and a plurality of bond pads 160 to an external control system. Flexure 147 can include any number of leads or traces.

As shown in FIG. 6A, Z-height 158 is a vertical dimension or distance between the top of base plate 132 and the bottom of slider 102. In an exemplary embodiment of the current disclosure, an integral structure of flexure 147 and gimbal 127 is attached to load beam 120 at middle weld locations. FIG. 4 is a top plan view, and FIG. 5 is a bottom view of such an exemplary HGA 116 including flexure 147 with electrical trace ribbon 152 and gimbal 127. FIG. 5 illustrates the axes about which roll rotational stiffness 172 and pitch rotational stiffness 174 are considered. In exemplary embodiments, the sensitivity of each of these parameters to Z-height is minimized by the provision of weld dimples 176 on at least the disk-facing surface of load beam 120 at middle weld locations for the attachment of flexure 147. In an exemplary embodiment, load beam 120 has an aperture 170 disposed through the load beam 120 at a location approximately mid-way between the opposed ends of the load beam 120 for savings in weight and materials. In an exemplary embodiment, the weld dimples 176 are positioned on opposite sides of the aperture 170.

As shown in FIG. 6B, the provision of weld dimples 176 pushes the weld locations at dimple base 178 away from the disk-facing surface of load beam 120 by the dimension of the dimple height 180. This virtually eliminates the angle of the stretched circuit portion 149 shown in the prior art device of FIG. 3 and instead moves the flexure 147 so that the gimbal 127 near its left end as illustrated in FIG. 6B is relatively flat.

Figure 7A:
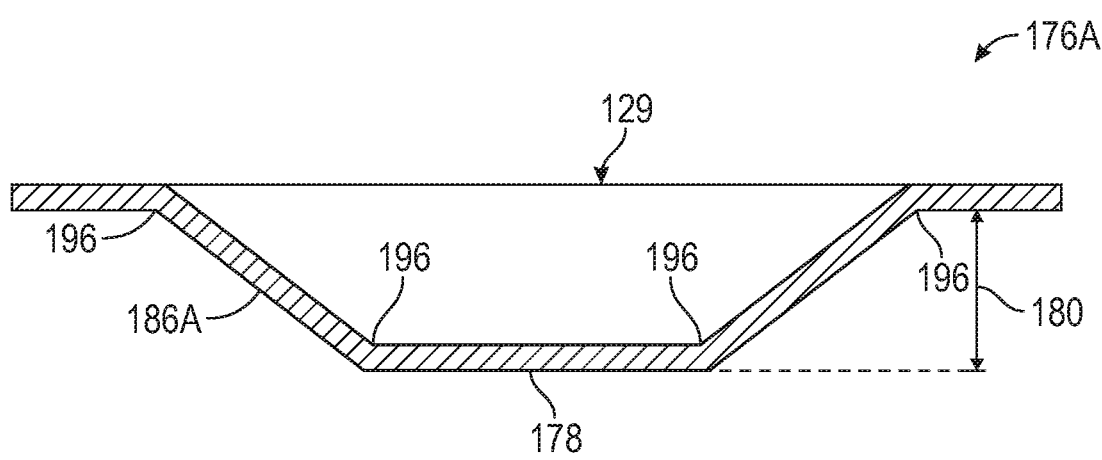
FIG. 7A is a cross-sectional side elevation view illustrating a first exemplary shape of a suitable weld dimple, taken at line 7A-7A of FIG. 4.
Figure 7B:
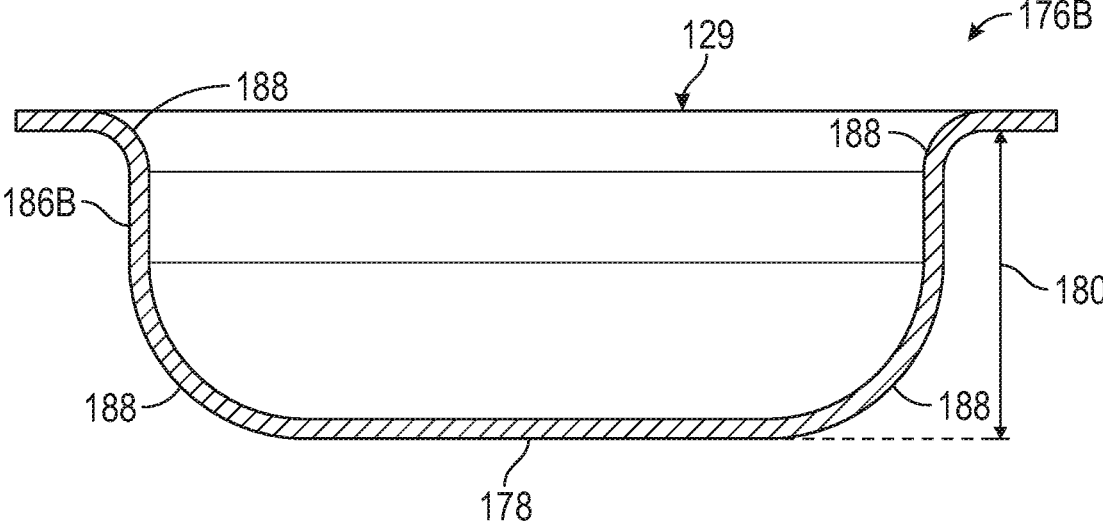
FIG. 7B is a cross-sectional side elevation view illustrating a second exemplary shape of a suitable weld dimple.

As shown in FIGS. 4, 6B and 7A, in an exemplary embodiment, each of the weld dimples 176A of load beam 120 can be formed with a substantially trapezoidal cross-sectional shape, with an angled annular wall 186A, terminating in a flat dimple base 178 that serves as a weld surface for the attachment of flexure 147. Thus, the three-dimensional dimple 176A has a truncated conical shape. In an exemplary embodiment, obtuse junctures 196 connect the angled annular wall 186A to each of the load beam surface and the dimple base. FIG. 7B is a cross-sectional view of another suitable shape for weld dimple 176B, having in common a flat dimple base 178 but in this case has a cylindrical annular wall 186B, connected to each of the load beam surface and dimple base 178 at radiused corners 188. Thus, the three-dimensional dimple 176B has a rounded cylindrical shape.

In exemplary embodiments, a flat portion of dimple base 178 is substantially parallel to the x-y plane. In an exemplary embodiment, a surface area of the flat portion of dimple base 178 on which flexure 147 may be attached, such as by welding, is preferably greater than about 10,000 square micrometers. A particularly suitable range of surface area for the flat portion of dimple base 178 is about 50,000 square micrometers to about 150,000 square micrometers.

The weld dimples 176 are configured for the attachment of flat dimple bases 178 to flexure 147, such as by welding, adhesive, or other means. Thus weld dimples 176 are different from the slider dimple 146, which allows for slider motion in three degrees of freedom. In exemplary embodiments, weld dimple 176 has a flat attachment surface at base 178, whereas slider dimple 146 is more commonly pointed or exhibits a hemispherical shape so that there is a single point of contact with a slider or its support structure.

In an exemplary method of formation of load beam 120, each weld dimple 176 is stamped or embossed into the plate material of the load beam 120. However, other formation methods can be used such as molding or casting a dimple 176 onto a surface of load beam 120. Such an added feature could have the configuration of a peg or stud, for example. Preferably, weld dimples 176 are formed during the fabrication of load beam 120 along with the steps for formation of its side rails 190, aperture 170, slots and other features so as to not require any additional formation steps.

As shown in FIGS. 2, 4 and 5, weld dimples 176 are preferably placed inward of side rails 190 to prevent changes in otherwise expected structural properties of the load beam 120. While two weld dimples 176 are illustrated, it is contemplated that fewer or more weld dimples 176 can be provided on a disk-facing surface of load beam 120 for contact with a top surface of flexure 147. Weld dimples 176 are illustrated at a "middle weld" location toward a middle or intermediate portion of the load beam 120 between its connection to base plate 132 and its other end at lift tab 128. However, one or more weld dimples 176 can be placed anywhere on load beam; such one or more weld dimples 176 are preferably placed symmetrically about centerline 168 and can occur in multiple locations along a length of the load beam 120. The placements and heights 180 of weld dimples 176 are preferably calibrated to result in a flexure 147 that is relatively flat.

Referring to FIG. 6B, in the case of a substantially planar load beam 120, a distance between tongue 182 of gimbal 127 (at which slider 102 is mounted) and load beam 120 surrounding dimple 146 is about the same as a distance between flexure 147 and a disk-facing surface of the load beam 120 surrounding the weld dimples 176. In some cases, both of these distances are the same as the weld dimple height 180 or nearly so. In an exemplary embodiment, the weld dimple height 180 is also substantially equal to a height dimension of the slider dimple 146. However, load beams 120 are often not planar, having a sag bend applied thereto. In such cases, a height 180 of a weld dimple 176 that results in a flat flexure 147 may be quite different from the height of slider dimple 146, depending on the geometry of the disc-facing surface of the load beam at the location of the weld dimple 176. Moreover, where multiple weld dimples 176 are provided on a single load beam 120, the multiple weld dimples 176 can have different heights 180 from each other.

Figure 8:
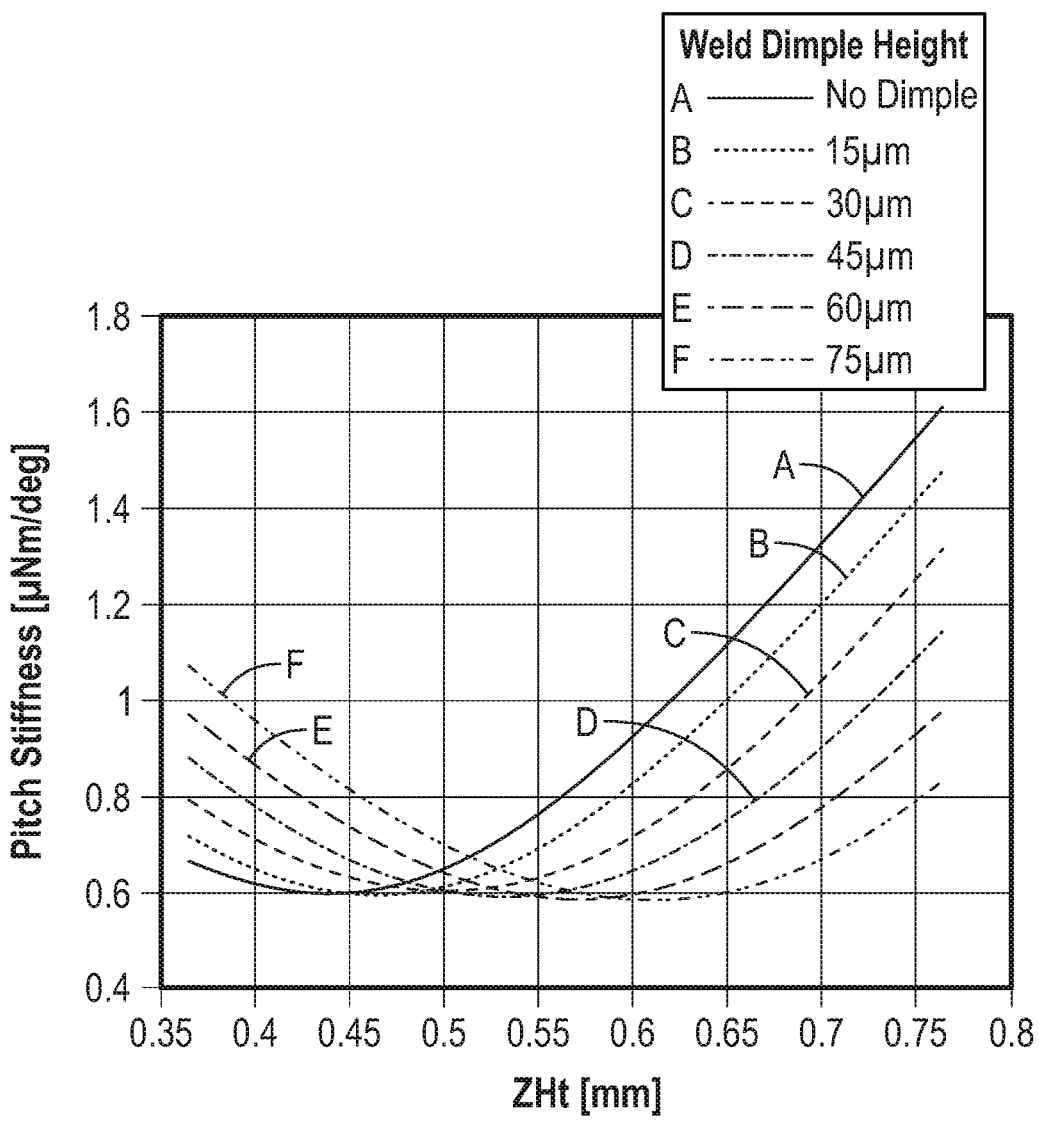
FIG. 8 is a graph showing pitch stiffness as a function of Z-height for load beams with weld dimples of various heights.

FIG. 8 is a graph of pitch stiffness versus Z-height. In a prior art HGA construction as shown in FIG. 3, the resulting plot A (no weld dimple) shows that the pitch stiffness is relatively low at low Z-heights with a trough at a Z-height of 0.45 millimeters but then sharply ascends with increasing Z-height. Referring back to FIG. 6A, a low Z-height 158 is achieved when slider 102 flies close to the base plate 132 and a greater Z-height 158 occurs when the slider 102 flies farther from the base plate 132. The present disclosure describes a structure for HGA construction (with weld dimples 176) that results in a desirable reduction in pitch stiffness variation along the range of Z-heights, such as those plotted between 0.35 millimeter and 0.80 millimeter.

As shown in FIG. 8, different weld dimple heights 180 result in different functions of pitch stiffness relative to Z-height, wherein the most balanced changes in pitch stiffness relative to a nominal Z-height occur with a weld dimple height of about 60 micrometers (plot E) for the most common dimensions of load beam 120. In a configuration in which weld dimple 176 has a weld dimple height 180 of about 60 micrometers, the resulting pitch stiffness to Z-height plot E shows that the pitch stiffness is at a minimum at about a Z-height of 0.56 mm. Stretching of the flexure 147 either up or down during DSD operation would result in greater pitch stiffness than at the minimum, but the variation on the low and high ends of Z-height would be greatly reduced compared to the conventional load beam construction represented by plot A (no weld dimple).

Figure 9:
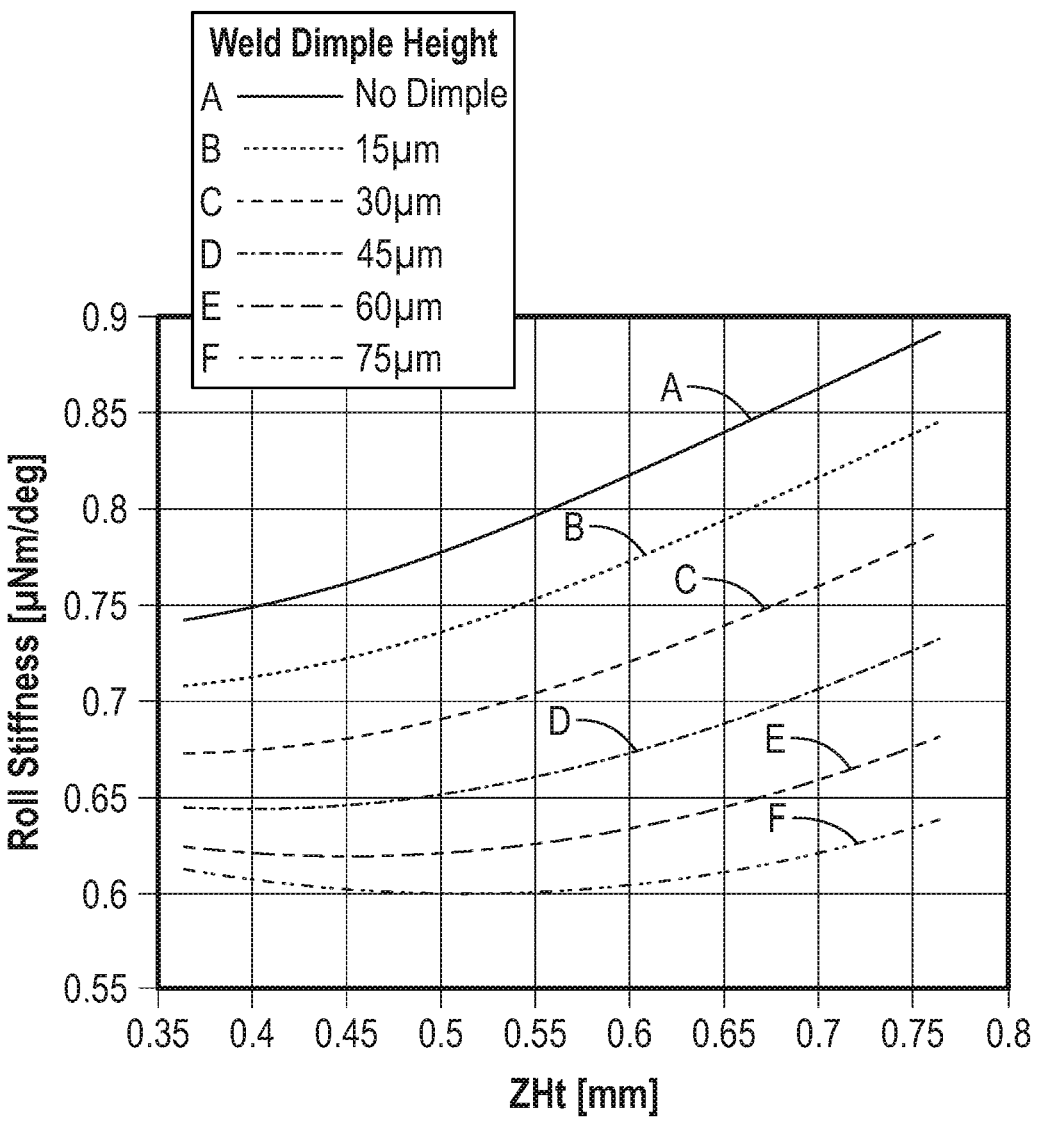
FIG. 9 is a graph illustrating roll stiffness as a function of Z-height for load beams with weld dimples of various heights.

FIG. 9 is a graph that shows plots for the same weld dimple height examples as functions of roll stiffness versus Z-height. Generally, the plots flatten as the weld dimple height 180 increases within the tested range. However, stiffness sensitivity is not the only parameter to be considered, and an "optimal" case also considers resonance. External forces exerted on the HDD may cause mechanical vibrations that match the natural resonant frequencies of the HGA. In some examples, if the frequency of the external vibrations match the natural resonant frequencies of the HGA, the slider may incorrectly read and/or write data on the magnetic storage media. Exciting the resonant frequencies of the HGA may potentially damage the slider or other components of the HGA, such as the microactuator.

Testing these weld dimple heights A-F within the range of Z-heights plotted resulted in the findings of Table 1.

TABLE 1

| Metric | No Weld Dimple | 45um Weld Dimple |
|---|---|---|
| Nominal Pitch Stiffness | 0.80257 [μNm/deg] | 0.59562 [μNm/deg] |
| Pitch Stiffness Range | 1.008 [μNm/deg] | 0.558 [μNm/deg] |
| Nominal Roll Stiffness | 0.79917 [μNm/deg] | 0.66349 [μNm/deg] |
| Roll Stiffness Range | 0.148 [μNm/deg] | 0.088 [μNm/deg] |
| Minimum Pitch Stiffness ZHt | 0.434 [mm] | 0.528 [mm] |
| <20 kHz FRF | Better low/nominal ZHt | Comparable high ZHt |
| >20 kHz FRF | Better low ZHt | Better nominal/high ZHt |

Tests conclude that generally the 45-micrometer dimple height had the best tradeoff between stiffness and resonance in that the 45-micrometer dimple height offers slightly more centered stiffness verses Z-height with only slight frequency response function (FRF) degradation. A load beam 120 with two weld dimples 176, each having a 45-micrometer height 180, exhibited a 26% reduction in nominal pitch stiffness and a 17% reduction in nominal roll stiffness compared to a prior load beam with no weld dimples.

As shown in FIGS. 8 and 9, with no weld dimples (plots A), the pitch and roll stiffnesses on the y-axis are nonlinear and change significantly with Z-height on the x-axis. This is a problem for active air bearing (AAB) slider designers, as pitch and roll stiffness are key inputs for the AAB design. Changes in stiffness across Z-height impact AAB performance, which is ideally designed for nominal Z-height. Having consistent pitch and roll stiffnesses across the Z-height range along the x-axis will improve AAB design and limit failures. The nonlinearity is caused in the prior art by stretching of the flexure circuit 147 as shown in FIG. 3 between the gimbal tongue (at which slider 102 is attached) and the middle weld at 165. Because of the Z offset 192, the circuit stretches at high Z-height and relaxes at low Z-height, leading to boundary condition differences of the gimbal tongue 182, which manifest into stiffness changes of the slider in the pitch and roll directions.

The middle weld dimples 176 of the current disclosure address these problems by moving the middle welds to the same Z plane as the gimbal tongue 182 at the contact point with slider 102; this places the flexure 147 at a relaxed state. While variations in Z-height will still cause the stretching effect, this effect is more symmetrical about a nominal Z-height with the weld dimples. This creates a local minimum in the stiffness versus Z-height curve at nominal Z-height and effectively reduces the overall stiffness variation in the range of Z-heights expected in the data storage device.

Referring to FIG. 6B, where the middle weld location is at the flat dimple base 178, it is in the same Z plane as gimbal tongue 182 at the location of contact with slider 102 (such as at slider dimple 146), thereby resulting in no Z offset. Thus, stretching of the flexure 147 is minimized. As shown in FIGS. 8 and 9, generally with increasing weld dimple height 180 within the tested range, overall pitch and roll stiffness variation across the Z-height target (x-axis) is reduced.

Exemplary, non-limiting embodiments of a data storage device and an actuator arm assembly are described. In one embodiment, a data storage device 100 comprises a data storage disk 104, an actuator arm 122, a load beam 120 attached to the actuator arm 122, and a flexure 147 attached to the load beam 120. The disk 104 has a read/write surface defining an x-y plane, and the actuator arm 122 is movable parallel to the x-y plane. The load beam 120 supports a slider 102 that carries a head that is configured to interact with the read/write surface. The load beam 120 comprises a first dimple 176 that extends toward the read/write surface and has a flat base 178. The flexure 147 is attached to the load beam 120 at the flat base 178 of the first dimple 176 and is attached to the slider 102. The flexure 147 is substantially parallel to the x-y plane between the flat base 178 of the dimple 176 and the slider 102, as shown in FIG. 6B, for example.

In an exemplary embodiment, the flat base 178 is circular. In an exemplary embodiment, the first dimple 176A has a truncated conical shape with an inclined annular wall 186A connected to the flat base 178. In another exemplary embodiment, the first dimple 176B has a cylindrical shape with an annular wall 186B disposed substantially perpendicular to the flat base 178. In an exemplary embodiment, a first end of the load beam 120 is attached to the actuator arm 122 via a base plate 132 (such as at attachment structure 118), and the first dimple 176 is located approximately mid-way between the first end of the load beam 120 and the slider 102, as shown in FIG. 2, for example. In an exemplary embodiment, as shown in FIG. 4 for example, the load beam 120 comprises a longitudinal centerline 168, wherein the first dimple 176 is one of a plurality of dimples 176, and wherein the plurality of dimples 176 are equidistantly spaced from the centerline 168.

In an exemplary embodiment as shown in FIG. 6B, for example, a second dimple 146 is in contact with the slider 102 (either directly or indirectly through flexure 147). In an exemplary embodiment, the first dimple 176 and the second dimple 146 have a common height 180. In an exemplary embodiment, a height 180 of the first dimple 176 ranges from about 30 micrometers to about 75 micrometers. In an exemplary embodiment, a height of the first dimple 180 ranges from about 40 micrometers to about 65 micrometers. In an exemplary embodiment, a height of the first dimple ranges from about 45 micrometers to about 60 micrometers. In an exemplary embodiment, a surface area of the flat base is about 50,000 square micrometers to about 150,000 square micrometers.

In another embodiment, an actuator arm assembly comprises an actuator arm 122, a load beam 120 and a flexure 147. The load beam 120 has a first end attached to the actuator arm 122 and an opposed second end, wherein the load beam 120 comprises a first dimple 176 located approximately midway between the first and second ends. The first dimple 176 comprises a flat base 178, and the flexure 147 is attached to the load beam 120 at the flat base 178 of the first dimple 176.

In an exemplary embodiment as shown in FIG. 4, for example, the load beam comprises an aperture 170 therethrough, the aperture 170 being positioned on a longitudinal centerline 168 of the load beam 120, and wherein the first dimple 176 is positioned on one side of the aperture 170. In an exemplary embodiment, a plurality of dimples 176 are arranged on opposed sides of the aperture 170. In an exemplary embodiment, the load beam 120 comprises a second dimple positioned 146 between the first dimple 176 and the second end of the load beam 120 near lift tab 128.

The illustrations of the embodiments described herein are intended to provide a general understanding of the structure of the various embodiments. The illustrations are not intended to serve as a complete description of all of the elements and features of apparatus and systems that utilize the structures or methods described herein. Features described with respect to any embodiment also apply to any other embodiment. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. All patent documents mentioned in the description are incorporated by reference.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all modifications, enhancements, and other embodiments, which fall within the scope of the present disclosure. For example, features described with respect to one embodiment may be incorporated into other embodiments. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
a data storage disk having a read/write surface defining an x-y plane;
an actuator arm that is movable parallel to the x-y plane;
a load beam attached to the actuator arm, wherein the load beam supports a slider that carries a head that is configured to interact with the read/write surface, wherein the load beam comprises a first dimple formed of the load beam, that has a substantially continuous annular wall of fixed height that extends toward the read/write surface and has a flat base; and a flexure attached, via direct rigid physical coupling, to the load beam at the flat base of the first dimple and attached to the slider, wherein the flexure is substantially parallel to the x-y plane between the flat base of the first dimple and the slider, and wherein a region of the load beam around the dimple is separated from the flexure by the fixed height of the substantially continuous annular wall of the dimple.

2. The data storage device of claim 1, wherein the flat base is circular.

3. The data storage device of claim 2, wherein the first dimple has a truncated conical shape, wherein the annular wall is inclined and is connected to the flat base.

4. The data storage device of claim 2, wherein the first dimple has a cylindrical shape, wherein the annular wall is disposed substantially perpendicular to the flat base.

5. The data storage device of claim 1, wherein the load beam comprises a longitudinal centerline, wherein the first dimple is one of a plurality of dimples, and wherein the plurality of dimples are equidistantly spaced from the centerline.

6. The data storage device of claim 1, comprising a second dimple in contact with the slider.

7. The data storage device of claim 6, wherein the first and second dimples have a common height.

8. The data storage device of claim 1, wherein the height of the annular wall ranges from about 30 micrometers to about 75 micrometers.

9. The data storage device of claim 1, wherein the height of the annular wall ranges from about 40 micrometers to about 65 micrometers.

10. The data storage device of claim 1, wherein the height of the annular wall ranges from about 45 micrometers to about 60 micrometers.

11. The data storage device of claim 1, wherein a surface area of the flat base is about 50,000 square micrometers to about 150,000 square micrometers.

12. An actuator arm assembly comprising:

an actuator arm;

a load beam having a first end attached to the actuator arm and an opposed second end, wherein the load beam comprises a first dimple formed of the load beam, that comprises a substantially continuous annular wall of fixed height and comprises a flat base; and a flexure attached, via direct rigid physical coupling, to the load beam at the flat base of the first dimple, wherein a region of the load beam around the dimple is separated from the flexure by the fixed height of the substantially continuous annular wall of the dimple.

13. The actuator arm assembly of claim 12, wherein the load beam comprises an aperture therethrough, the aperture being positioned on a longitudinal centerline of the load beam, and wherein the first dimple is positioned on one side of the aperture.

14. The actuator arm assembly of claim 13, wherein the first dimple is one of a plurality of dimples, and wherein the plurality of dimples are arranged on opposed sides of the aperture.

15. The actuator arm assembly of claim 12, wherein the flat base is circular.

16. The actuator arm assembly of claim 12, wherein the first dimple has a truncated conical shape, wherein the annular wall is inclined and is connected to the flat base.

17. The actuator arm assembly of claim 12, wherein the first dimple has a cylindrical shape, wherein the annular wall is disposed substantially perpendicular to the flat base.

18. The actuator arm assembly of claim 12, wherein the load beam comprises a second dimple positioned between the first dimple and the second end.

19. The actuator arm assembly of claim 18, wherein the first and second dimples have a common height.

20. A data storage device comprising:

a data storage disk having a read/write surface defining an x-y plane;

an actuator arm that is movable parallel to the x-y plane;

a load beam attached to the actuator arm, wherein the load beam supports a slider that carries a head that is configured to interact with the read/write surface, wherein the load beam comprises a first dimple formed of the load beam, that has a substantially continuous annular wall of fixed height that extends toward the read/write surface and has a flat base;

a flexure attached to the load beam at the flat base of the first dimple and attached to the slider, wherein the flexure is substantially parallel to the x-y plane between the flat base of the first dimple and the slider, and wherein a region of the load beam around the dimple is separated from the flexure by the fixed height of the substantially continuous annular wall of the dimple; and a base plate via which a first end of the load beam is attached to the actuator arm, and wherein the first dimple is located approximately mid-way between the first end of the load beam and the slider.

\* \* \* \* \*